April 24, 1928.

A. B. COUTURE 1,667,344

AUTOMOBILE WHEEL

Filed Sept. 9, 1926

Inventor

ALLAN B. COUTURE

By J. King Harness

Attorney

Patented Apr. 24, 1928.

1,667,344

UNITED STATES PATENT OFFICE.

ALLAN B. COUTURE, OF DETROIT, MICHIGAN, ASSIGNOR TO CHRYSLER CORPORATION, OF DETROIT, MICHIGAN, A CORPORATION OF DELAWARE.

AUTOMOBILE WHEEL.

Application filed September 9, 1926. Serial No. 134,416.

REISSUED

This invention relates to wheel balancing and more particularly to a means for balancing the unbalanced forces of an automobile wheel and tire.

In the manufacture of automobile wheels and tires, there are certain portions of each which are heavier than other portions and in the use of pneumatic tires the valve stem and its associated parts cause the wheel to rotate irregularly. It is therefore an object of this invention to add a plurality of weights to the wheel which may be varied to compensate for the unbalanced forces.

Another object of the invention is to construct the weights in such a manner that they may be mounted on the inner periphery of the felloe adaptable either to wire wheels, in which case the tire is mounted on the felloe, or to disk or wooden wheels with a tire mounted on a rim.

A further object is to construct and mount the weights such that the unbalanced forces of the wheel, tire and rim may be compensated for without disassembling or removing the tire or rim.

Another object is to provide weights of equal size which may be varied in weight to compensate the unbalanced forces.

These and other objects will more fully appear from the following description taken in connection with the accompanying drawings, in which.

Figure 1:
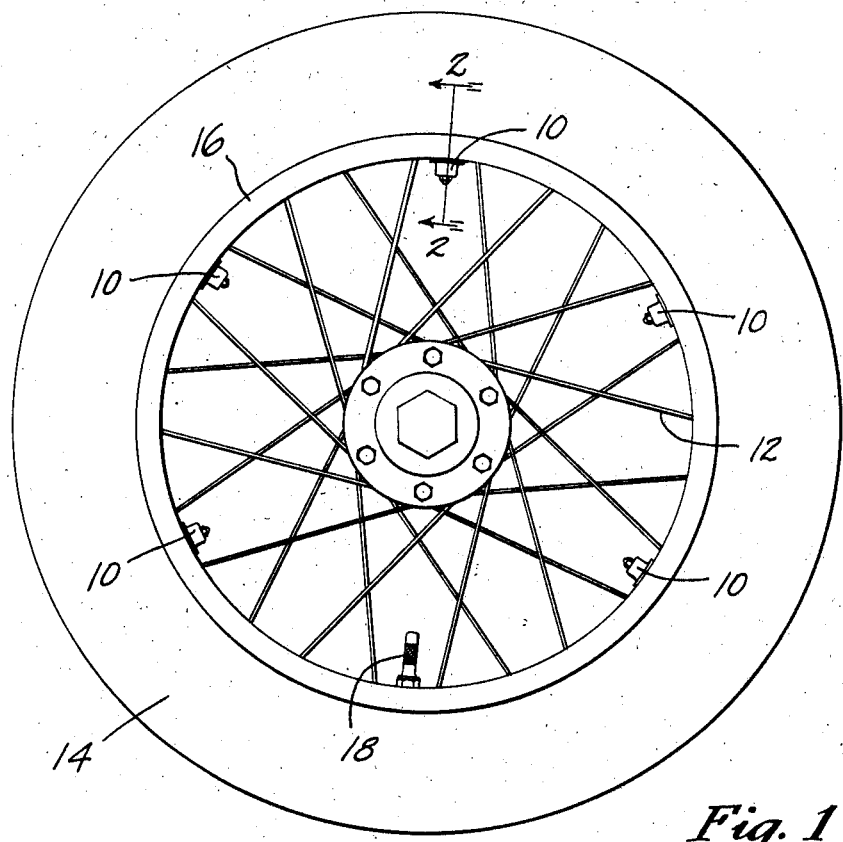
Fig. 1 is a side elevation of a wheel showing my improved balancing means.
Figure 2:
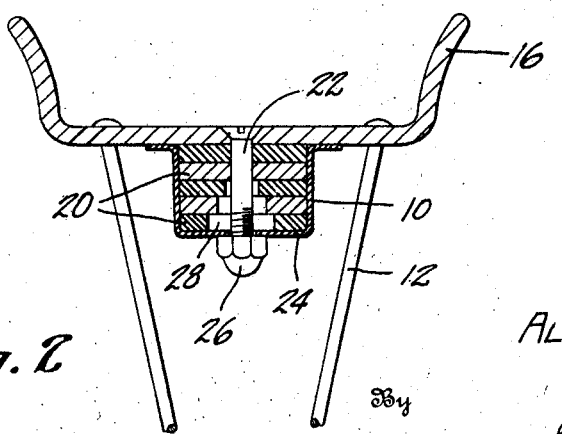
Fig. 2 is an enlarged sectional view taken on line 2—2 of Fig. 1.

In the illustrated embodiment of my invention, the weights 10 have been applied to a wire wheel 12 having the tire 14 mounted on the felloe 16. This form has been selected in view of showing the adaptation of the weights with no clearance between the tire and felloe and it will be understood that they may be mounted equally as well where there is clearance as in the case of a tire rim used with a wooden or disk wheel.

One weight has been placed diametrically opposite the valve stem 18 and other weights have been spaced at equal intervals between the weight and valve stem.

Each weight comprises a plurality of washers 20 carried on the inner periphery of the felloe 16 by a bolt 22 extending through the felloe and washers, and a cup member 24 covering the washers. A nut 26 secures the washers and cup on the bolt against the felloe. While the bolt 22 has been shown as a slotted screw and inserted from the outer periphery of the felloe it is to be understood that any projecting stud such as will receive the washers 22 and cup member 24 may be substituted.

As a means of varying the weights, the washers 20 have been shown with their central opening 28 varying in diameter so that a washer having a large opening may be substituted for one having a smaller opening thereby decreasing the weight or the substitution may be reversed and the weight increased.

The cup members 24 are equal in size, the thickness of each washer is the same and the outer diameter of each washer snugly fits the inner periphery of the cup so that the washers are securely held against rattling within the cup 24 between the felloe 16 and nut 26, regardless of the weight or diameter of the inner opening. Each weight is independently varied according to the amount or position of the portion unbalanced.

In balancing a wheel and tire it is not necessary to remove the tire, all that is required to do is to remove the nut and cup and substitute a heavier or lighter washer as may be required to balance that portion. The weights are adaptable to any wheel and are neat in appearance.

While one embodiment of my invention has been illustrated it is not my intention to limit it to that particular form or to the use on wire wheels, as such changes including size and arrangement of parts may be made without departing from the spirit or scope of the invention covered by the following claims.

What I claim is:

1. An automobile wheel comprising a felloe, a valve stem in said felloe, a variable weight diametrically opposite said valve stem secured to the inner periphery of said felloe, and other variable weights secured to the inner periphery of said felloe spaced at equal intervals between said first mentioned weight and said valve stem.

2. A plurality of weights secured to the inner periphery of a wheel felloe, each comprising a radially projecting member carried by said felloe, a plurality of washers surrounding said projecting member, a cup member adapted to enclose said washers, and means carried by said projecting member for securing said cup member in contact with said felloe and one of said washers.

3. In a device of the class described comprising a part to be balanced, a cup shaped member, a plurality of members having varying apertures therein adapted to be received in said cup member, and means for securing said cup member and members on the part to be balanced.

4. In a device of the class described comprising a part to be balanced, a cup shaped member, a plurality of washers adapted to be received in said cup member, and means for securing said cup member and washers on the part to be balanced.

5. An automobile wheel comprising a felloe, a tire on said felloe, a valve stem projecting radially through said felloe, a screw threaded stud projecting radially through said felloe at a point diametrically opposite said valve stem, a plurality of washers on said stud, a cup member fitting the outer surfaces of said washers, and means carried by said stud for securing said cup member in contact with said felloe and one of said washers.

6. An automobile wheel and a balancing weight applied thereto comprising a receptacle secured to the wheel, a plurality of objects in the receptacle, some of which vary in weight from others.

7. An automobile wheel and means for balancing it comprising a plurality of receptacles secured in spaced relation on the wheel, each containing a plurality of objects.

8. An automobile wheel and means for balancing it comprising a plurality of receptacles secured in spaced relation on the wheel, each containing a plurality of objects of varying weight.

9. An automobile wheel and a balancing weight applied thereto comprising a receptacle secured to the wheel, a plurality of objects in the receptacle, all of which have the same outside contour but some of which vary in weight from others.

ALLAN B. COUTURE.